United States Patent
Cogen et al.

(10) Patent No.: US 7,438,748 B2
(45) Date of Patent: Oct. 21, 2008

(54) FLAME RETARDANT COMPOSITION

(75) Inventors: Jeffrey M. Cogen, Flemington, NJ (US); Thomas S. Lin, Whippany, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 82 days.

(21) Appl. No.: 10/546,176

(22) PCT Filed: Feb. 11, 2004

(86) PCT No.: PCT/US2004/004154

§ 371 (c)(1), (2), (4) Date: Aug. 18, 2005

(87) PCT Pub. No.: WO2004/074361

PCT Pub. Date: Sep. 2, 2004

(65) Prior Publication Data

US 2006/0269771 A1   Nov. 30, 2006

Related U.S. Application Data

(60) Provisional application No. 60/448,024, filed on Feb. 18, 2003.

(51) Int. Cl.
| | |
|---|---|
| C09K 21/00 | (2006.01) |
| C09K 21/02 | (2006.01) |
| C09K 21/14 | (2006.01) |
| C08K 3/22 | (2006.01) |
| C08K 3/26 | (2006.01) |
| C08K 3/34 | (2006.01) |
| C08K 7/00 | (2006.01) |
| H01B 7/29 | (2006.01) |
| H01B 7/295 | (2006.01) |

(52) U.S. Cl. ............ 106/18.11; 106/15.05; 106/18.12; 106/18.21; 106/18.26; 252/601; 252/608; 252/609; 428/921; 524/425; 524/445

(58) Field of Classification Search ............... 106/15.05, 106/18.11, 18.12, 18.21, 18.26; 524/445, 524/425; 252/601, 608, 609; 428/921
See application file for complete search history.

(56) References Cited

U.S. PATENT DOCUMENTS

| | | | | |
|---|---|---|---|---|
| 4,708,975 | A | * | 11/1987 | Shain .......................... 523/216 |
| 4,722,858 | A | * | 2/1988 | Harbourne et al. .......... 428/220 |
| 4,826,899 | A | | 5/1989 | Rees |
| 6,750,282 | B1 | * | 6/2004 | Schall et al. ................. 524/445 |

FOREIGN PATENT DOCUMENTS

| | | |
|---|---|---|
| EP | 0295336 A2 | 12/1988 |
| EP | 0370517 B1 | 5/1990 |
| EP | 0831120 | 3/1998 |
| EP | 1052534 A1 | 11/2000 |
| JP | 55112248 | 8/1980 |
| JP | 56-84947 A * | 7/1981 |
| JP | 2000080213 | 3/2000 |
| WO | WO-0052712 | 9/2000 |
| WO | WO-0066657 | 11/2000 |
| WO | WO-0068312 | 11/2000 |
| WO | WO-0105880 A1 | 1/2001 |
| WO | WO-03082966 A1 | 10/2003 |

* cited by examiner

*Primary Examiner*—Anthony J Green

(57) ABSTRACT

The present invention is a flame-retardant composition comprising a polyolefin polymer, a nano-silicate, a metal hydroxide, and calcium carbonate. The invention also includes a coating prepared from the flame-retardant composition as well as a wire-and-cable construction made by applying the coating over a wire or a cable. The invention also includes articles prepared from the flame-retardant composition, such as extruded sheets, thermoformed sheets, injection-molded articles, coated fabrics, roofing membranes, and wall coverings.

17 Claims, No Drawings

FLAME RETARDANT COMPOSITION

This is a national stage application filed under 35 U.S.C. §371 of International No. PCT/US2004/04154, filed on Feb. 11, 2004, which claims the benefit of Provisional Application No. 60/448,024, filed on Feb. 18, 2003.

This invention relates to a flame-retardant composition that is useful for wire-and-cable applications. This invention also relates to wire-and-cable constructions made from the flame-retardant composition. Moreover, the flame retardant composition of this invention is generally useful for applications requiring flame retardancy such as extruded or thermoformed sheets, injection-molded articles, coated fabrics, construction (for example, roofing membranes and wall coverings), and automotive.

Generally, cables must be flame retardant for use in enclosed spaces, such as automobiles, ships, buildings, and industrial plants. Flame-retardant performance of the cable is often achieved by making the cable insulation or outer jacket from a blend of flame-retardant additives and polymeric materials.

Examples of flame-retardant additives and mechanisms for their use with polymers are described in Menachem Lewis & Edward D. Weil, *Mechanisms and Modes of Action in Flame Retardancy of Polymers*, in FIRE RETARDANT MATERIALS 31-68 (A. R. Horrocks & D. Price eds., 2001) and Edward D. Weil, *Snergists, Adjuvants, and Antagonists in Flame-Retardant Systems*, in FIRE RETARDANCY OF POLYMERIC MATERIALS 115-145 (A. Grand and C. Wilke eds., 2000).

Flame-retardant additives for use in polyolefin-based compositions include metal hydroxides and halogenated compounds. Useful metal hydroxides include magnesium hydroxide and aluminum trihydroxide, and useful halogenated compounds include decabromodiphenyloxide.

While flame-retardant additives may operate by one or more mechanisms to inhibit the burning of the polymeric composition made from or containing the additives, metal hydroxides endothermically liberate water upon heating during combustion. When used in polyolefin-based compositions, metal hydroxides can unfortunately liberate water at elevated processing temperatures and thereby adversely affect fabrication and extrusion of insulating or jacketing layers. Significantly, such release of water can also cause the composition to foam and thereby result in rough surfaces or voids in the insulation or jacket layer.

Because the quantity of a flame-retardant additive in a polyolefin-based composition can directly affect the composition's flame-retardant performance, it is often necessary to use high levels of flame retardant additives in the composition. For example, a wire-and-cable composition may contain as much as 65 percent by weight of inorganic fillers or 25 percent by weight of halogenated additives. Unfortunately, the use of high levels of flame-retardant additives can be expensive and degrade processing of the composition as well as degrade the insulating or jacketing layer's electrical, physical, and mechanical properties. Accordingly, it may be necessary to balance flame retardant performance against cost, processing characteristics, and other properties.

EP 0 370 517 B1, EP 1 052 534 A1, WO 00/52712, WO 00/66657, WO 00/68312, and WO 01/05880 describe the use of various clay and other layered silicates to improve the burning characteristics of various polymers. None of these references teaches the replacement of up to 50 percent by weight of a flame-retarding metal hydroxide generally with the inert filler calcium carbonate. While U.S. Pat. No. 4,826,899 describes replacing up to 50 percent of alumina trihydrate with calcium carbonate in thermoplastic multi-block copolyester composition, the inventors require that the composition also contain at least 12 percent by weight of magnesium hydroxide and a brominated flame-retardant additive.

A polyolefin-based, flame-retardant composition, having desirable processing characteristics and cost advantages over conventional compositions while retaining desirable flame retardant performance, is needed. More specifically, a polyolefin-based, flame-retardant-cable composition, having calcium carbonate present in amount up to the total amount of metal hydroxide components, is needed.

The present invention is a flame-retardant composition comprising a polyolefin polymer, a nano-silicate, a metal hydroxide, and calcium carbonate. The invention also includes a coating prepared from the flame-retardant composition as well as a wire-and-cable construction made by applying the coating over a wire or a cable. The invention also includes articles prepared from the flame-retardant composition, such as extruded sheets, thermoformed sheets, injection-molded articles, coated fabrics, roofing membranes, and wall coverings.

Suitable wire-and-cable constructions, which may be made by applying the coating over a wire or a cable, include: (a) insulation and jacketing for copper telephone cable, coaxial cable, and medium and low voltage power cable and (b) fiber optic buffer and core tubes. Other examples of suitable wire-and-cable constructions are described in ELECTRIC WIRE HANDBOOK (J. Gillett & M. Suba, eds., 1983) and POWER AND COMMUNICATION CABLES THEORY AND APPLICATIONS (R. Baitnikas & K Srivastava eds., 2000). Moreover, additional examples of suitable wire-and-cable constructions would be readily apparent to persons of ordinary skill in the art. Any of these constructions can be advantageously coated with a composition of the present invention.

The invented flame-retardant composition comprises a polyolefin polymer and effective amounts of a nano-silicate, a metal hydroxide, and calcium carbonate. Suitable polyolefin polymers include ethylene polymers, propylene polymers, and blends thereof.

Ethylene polymer, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester (for example, vinyl acetate or an acrylic or methacrylic acid ester), a copolymer of ethylene and an unsaturated acid such as acrylic acid, or a copolymer of ethylene and a vinyl silane (for example, vinyltrimethoxysilane and vinyltriethoxysilane).

The polyethylene can be homogeneous or heterogeneous. The homogeneous polyethylenes usually have a polydispersity (Mw/Mn) in the range of 1.5 to 3.5 and an essentially uniform comonomer distribution, and are characterized by a single and relatively low melting point as measured by a differential scanning calorimeter. The heterogeneous polyethylenes usually have a polydispersity (Mw/Mn) greater than 3.5 and lack a uniform comonomer distribution. Mw is defined as weight average molecular weight, and Mn is defined as number average molecular weight.

The polyethylenes can have a density in the range of 0.860 to 0.960 gram per cubic centimeter, and preferably have a density in the range of 0.870 to 0.955 gram per cubic centimeter. They also can have a melt index in the range of 0.1 to 50 grams per 10 minutes. If the polyethylene is a homopolymer, its melt index is preferably in the range of 0.75 to 3 grams per 10 minutes. Melt index is determined under ASTM D-1238, Condition E and measured at 190 degree C and 2160 grams.

Low- or high-pressure processes can produce the polyethylenes. They can be produced in gas phase processes or in liquid phase processes (that is, solution or slurry processes) by conventional techniques. Low-pressure processes are typically run at pressures below 1000 pounds per square inch ("psi") whereas high-pressure processes are typically run at pressures above 15,000 psi.

Typical catalyst systems for preparing these polyethylenes include magnesium/titanium-based catalyst systems, vanadium-based catalyst systems, chromium-based catalyst systems, metallocene catalyst systems, and other transition metal catalyst systems. Many of these catalyst systems are often referred to as Ziegler-Natta catalyst systems or Phillips catalyst systems. Useful catalyst systems include catalysts using chromium or molybdenum oxides on silica-alumina supports.

Useful polyethylenes include low density homopolymers of ethylene made by high pressure processes (HP-LDPEs), linear low density polyethylenes (LLDPEs), very low density polyethylenes (VLDPEs), ultra low density polyethylenes (ULDPEs), medium density polyethylenes (MDPEs), high density polyethylene (HDPE), and metallocene copolymers.

High-pressure processes are typically free radical initiated polymerizations and conducted in a tubular reactor or a stirred autoclave. In the tubular reactor, the pressure is within the range of 25,000 to 45,000 psi and the temperature is in the range of 200 to 350 degree C. In the stirred autoclave, the pressure is in the range of 10,000 to 30,000 psi and the temperature is in the range of 175 to 250 degree C.

Copolymers comprised of ethylene and unsaturated esters or acids are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 5 to 50 percent by weight based on the weight of the copolymer, and is preferably in the range of 15 to 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids.

The melt index of the ethylene/unsaturated ester copolymers or ethylene/unsaturated acid copolymers can be in the range of 0.5 to 50 grams per 10 minutes, and is preferably in the range of 2 to 25 grams per 10 minutes.

Copolymers of ethylene and vinyl silanes may also be used. Examples of suitable silanes are vinyltrimethoxysilane and vinyltriethoxysilane. Such polymers are typically made using a high-pressure process. Use of such ethylene vinylsilane copolymers is desirable when a moisture crosslinkable composition is desired. Optionally, a moisture crosslinkable composition can be obtained by using a polyethylene grafted with a vinylsilane in the presence of a free radical initiator. When a silane-containing polyethylene is used, it may also be desirable to include a crosslinking catalyst in the formulation (such as dibutyltindilaurate or dodecylbenzenesulfonic acid) or another Lewis or Bronsted acid or base catalyst.

The VLDPE or ULDPE can be a copolymer of ethylene and one or more alpha-olefins having 3 to 12 carbon atoms and preferably 3 to 8 carbon atoms. The density of the VLDPE or ULDPE can be in the range of 0.870 to 0.915 gram per cubic centimeter. The melt index of the VLDPE or ULDPE can be in the range of 0.1 to 20 grams per 10 minutes and is preferably in the range of 0.3 to 5 grams per 10 minutes. The portion of the VLDPE or ULDPE attributed to the comonomer(s), other than ethylene, can be in the range of 1 to 49 percent by weight based on the weight of the copolymer and is preferably in the range of 15 to 40 percent by weight.

A third comonomer can be included, for example, another alpha-olefin or a diene such as ethylidene norbornene, butadiene, 1,4-hexadiene, or a dicyclopentadiene. Ethylene/propylene copolymers are generally referred to as EPRs and ethylene/propylene/diene terpolymers are generally referred to as an EPDM. The third comonomer can be present in an amount of 1 to 15 percent by weight based on the weight of the copolymer and is preferably present in an amount of 1 to 10 percent by weight. It is preferred that the copolymer contains two or three comonomers inclusive of ethylene.

The LLDPE can include VLDPE, ULDPE, and MDPE, which are also linear, but, generally, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of 1 to 20 grams per 10 minutes, and is preferably in the range of 3 to 8 grams per 10 minutes.

Any polypropylene may be used in these compositions. Examples include homopolymers of propylene, copolymers of propylene and other olefins, and terpolymers of propylene, ethylene, and dienes (for example, norbornadiene and decadiene). Additionally, the polypropylenes may be dispersed or blended with other polymers such as EPR or EPDM. Examples of polypropylenes are described in POLYPROPYLENE HANDBOOK: POLYMERIZATION, CHARACTERIZATION, PROPERTIES, PROCESSING, APPLICATIONS 3-14, 113-176 (E. Moore, Jr. ed., 1996).

Suitable polypropylenes may be components of TPEs, TPOs and TPVs. Those polypropylene-containing TPEs, TPOs, and TPVs can be used in this application.

The nano-silicate has at least one dimension in the 0.9 to 200 nanometer-size range, preferably 0.9 to 150 nanometers, more preferably 0.9 to 100 nanometers, and most preferably 0.9 to 30 nanometers. The nano-silicates are effective in the composition at a concentration of 0.1 percent to 15 percent by weight, based on the total formulation.

Preferably, the nano-silicates are layered, including nano-silicates such as montmorillonite, magadiite, fluorinated synthetic mica, saponite, fluorhectorite, laponite, sepiolite, attapulgite, hectorite, beidellite, vermiculite, kaolinite, nontronite, volkonskoite, stevensite, pyrosite, sauconite, and kenyaite. In the more preferred embodiment, the layered nano-silicates of the present invention are montmorillonite or magadiite. The layered nano-silicates may be naturally occurring or synthetic.

Some of the cations (for example, sodium ions) of the nano-silicate can be exchanged with an organic cation, by treating the nano-silicate with an organic cation-containing compound. Alternatively, the cation can include or be replaced with a hydrogen ion (proton). For wire and cable compositions, preferred exchange cations are imidazolium, phosphonium, ammonium, alkyl ammonium, and polyalkyl ammonium. An example of a suitable ammonium compound is dimethyl, di(hydrogenated tallow) ammonium. Preferably, the cationic coating will be present in 15 to 50 percent by weight, based on the total weight of layered nano-silicate plus cationic coating. In the most preferred embodiment, the cationic coating will be present at greater than 30 percent by weight, based on the total weight of layered nano-silicate plus cationic coating. Another preferred ammonium coating is octadecyl ammonium.

The composition may contain a coupling agent to improve the compatibility between the polyolefin polymer and the nano-silicate. Examples of coupling agents include silanes, titanates, zirconates, and various polymers grafted with maleic anhydride. Other coupling technology would be readily apparent to persons of ordinary skill in the art and is considered within the scope of this invention.

Suitable metal hydroxide compounds include aluminum trihydroxide (also known as ATH or aluminum trihydrate) and magnesium hydroxide (also known as magnesium dihydroxide). Other flame-retarding metal hydroxides are known to persons of ordinary skill in the art. The use of those metal hydroxides is considered within the scope of the present invention.

Calcium carbonate is also well known in the art.

The surface of the metal hydroxide and/or the calcium carbonate may be coated with one or more materials, including silanes, titanates, zirconates, carboxylic acids, and maleic anhydride-grafted polymers. Suitable coatings include those disclosed in U.S. Pat. No. 6,500,882. The average particle size may range from less than 0.1 micrometers to 50 micrometers. In some cases, it may be desirable to use a metal hydroxide and/or calcium carbonate having a nano-scale particle size. The metal hydroxide and/or the calcium carbonate may be naturally occurring or synthetic.

The flame-retardant composition may contain other flame-retardant additives. Other suitable non-halogenated flame retardant additives include red phosphorus, silica, alumina, titanium oxides, talc, clay, organo-modified clay, zinc borate, antimony trioxide, wollastonite, mica, silicone polymers, phosphate esters, hindered amine stabilizers, ammonium octamolybdate, intumescent compounds, and expandable graphite. Suitable halogenated flame retardant additives include decabromodiphenyl oxide, decabromodiphenyl ethane, ethylene-bis (tetrabromophthalimide), and dechlorane plus.

In addition, the composition may contain other additives such as antioxidants, stabilizers, blowing agents, carbon black, pigments, processing aids, peroxides, cure boosters, and surface active agents to treat fillers may be present. Furthermore, the composition may be thermoplastic or crosslinked.

In a preferred embodiment, the flame-retardant composition comprises: (a) a polyolefin polymer selected from the group consisting of ethylene polymers and propylene polymers; (b) a layered nano-silicate selected from the group consisting of montmorillonite and magadiite; (c) a metal hydroxide selected from the group consisting of aluminum trihydroxide and magnesium hydroxide; and (d) calcium carbonate.

In another embodiment of the present invention, the invention is a coating prepared from the flame-retardant composition.

In yet another embodiment of the present invention, a variety of methods for preparing suitable wire-and-cable constructions are contemplated and would be readily apparent to persons of ordinary skill in the art. For example, conventional extrusion processes may be used to prepare a flame-retardant wire or cable construction by applying the flame-retardant composition as a coating over a wire or a cable.

In another embodiment of the present invention, the invention is an article prepared from the flame-retardant composition, where the article is selected from the group consisting of extruded sheets, thermoformed sheets, injection-molded articles, coated fabrics, roofing membranes, and wall coverings. For these applications, it is contemplated that the flame-retardant composition may be used to prepare articles in a variety of processes including extrusion, thermoforming, injection molded, calendering, and blow molding as well as other processes readily apparent to persons of ordinary skill in the art.

EXAMPLES

The following non-limiting examples illustrate the invention.

Example 1

The Nano-Silicate Masterbatch

A montmorillonite in ethylene vinylacetate copolymer masterbatch was prepared using a Brabender™ mixer equipped with a 250-ml mixing bowl. The mixer was set to a mixing temperature of 120 degrees C. and mixing rate of 100 RPM. The mixer was initially charged with DuPont Elvax 265™ ethylene vinylacetate copolymer ("EVA-1") and Irganox 1010FF™ tetrakis [methylene (3,5-di-tert-butyl-4-hydroxyhydro-cinnamate)]methane. The ethylene vinylacetate copolymer contained 28 percent vinyl acetate by weight and had a melt index of 3 grams/10 min. After the mixture was fully melted, the mixer was then charged with Nanomer I.30P™ montmorillonite clay, having been treated with 30 percent by weight of octadecylammonium and available from Nanocor, Inc.

The three components were added at a weight ratio of 49.80:50.00:0.20 of EVA-1:montmorillonite:Irganox 1010FF™ tetrakis [methylene (3,5-di-tert-butyl-4-hydroxyhydro-cinnamate)]methane. After the components were added, the mixing time was continued for 15 minutes.

Examples 2-44

The Comparative Specimens

For preparing Examples 2-44, a Brabender™ mixer equipped with a 250-ml mixing bowl was also used. The mixer was set to a mixing temperature of 110 degrees C. and mixing rate of 80 RPM.

The mixer was initially charged with an ethylene vinylacetate copolymer and 0.20 percent by weight of Irganox 1100FF™ tetrakis [methylene (3,5-di-tert-butyl-4-hydroxyhydro-cinnamate)]methane. The ethylene vinylacetate copolymer used was dupont Elvax 260™ ethylene vinylacetate ("EVA-2"), which contained 28 percent vinyl acetate by weight and had a melt index of 6 grams/10 min.

After the EVA-2 mixture was fully melted, the remaining components were sequentially added in the proportions shown: (1) the nano-silicate masterbatch; (2) the metal hydroxide; (3) the calcium carbonate; and (4) 10 percent by weight of maleic anhydride grafted polyethylene. Mixing was then continued for 15 minutes.

When the metal hydroxide was magnesium hydroxide, the metal hydroxide had a surface area of 6.1 $m^2/g$, as determined by the BET method, and an average particle size of 0.8 microns (800 nanometers) and was surface treated with 0.1 percent by weight of oleic acid. When the metal hydroxide was aluminum trihydroxide, the metal hydroxide had a surface area of 5.2 m²/g, as determined by the BET method, and an average particle size of 1.1 microns (1100 nanometers).

The calcium carbonate was ground and had a surface area of 3 m²/g, as determined by the BET method, and an average particle size of 3.5 microns (3500 nanometers). The maleic anhydride grafted polyethylene was a linear low density ethylene-hexene copolymer grafted with 0.3 percent by weight of maleic anhydride and having melt index of 3.2 grams/10 minutes and a density of 0.917 grams/cc.

Examples 2-44 yielded compositions having the nano-silicate, the metal hydroxide, and the calcium carbonate components together constituting 35 percent, 50 percent, or 65 percent by weight of the total composition.

The compositions were then removed from the mixer and prepared in to test specimens suitable for testing in the UL-94 Vertical Flame Test. The test results are provided in Tables I-III.

In the UL-94 test, a flame is applied to a test specimen twice and the duration of burning after each flame application is noted. A shorter time represents better performance. An UL-94 rating of V0 is the best rating possible and indicates that a material self extinguishes quickly without releasing flaming drops while burning.

The test specimens had a thickness of 125 mil. The burn time is listed in seconds for each specimen for the first and second flame application and separated by a slash. If the table does not show a slash, a second flame application was not applied. The total flaming combustion time is the sum of the first and second burn times for all five samples, except when less than five samples were burned. When less than five samples were burned, the total flaming combustion time is the sum of the first and second burn times for all samples burned.

A. 35 Percent Test Specimens

Examples 2-7 and 8-16 represent 35 percent by weight component compositions. None of the test specimens prepared from the 35 percent composition achieved a V0 rating.

B. 50 Percent Test Specimens

Examples 17-21 and 22-29 represent 50 percent by weight component compositions. None of the test specimens prepared from the 50 percent composition achieved a V0 rating.

C. 65 Percent Test Specimens

Examples 30-35 and 36-44 represent 65 percent by weight component compositions. Test specimens prepared from a composition having the flame-retardant additive mixture comprised of only a metal hydroxide at 65 percent by weight achieved a V0 rating as illustrated by Examples 35 and 44. The test specimen prepared from a composition having the flame retardant additive mixture comprised of only calcium carbonate at 65 percent by weight failed to achieve a V0 rating as illustrated by Example 42.

Test specimens prepared from a composition having a two-component flame retardant additive mixture comprised of a metal hydroxide at 62 percent by weight and the nano-silicate at 3 percent by weight also achieved a V0 rating as illustrated by Examples 33 and 41. Test specimens prepared from a composition having a two-component flame retardant additive mixture comprised of a metal hydroxide at 59 percent by weight and the nano-silicate at 6 percent by weight also achieved a V0 rating as illustrated by Examples 31 and 38.

Test specimens prepared from a composition having a two-component flame retardant additive mixture comprised of calcium carbonate at 62 percent by weight and the nano-silicate at 3 percent by weight failed to achieved a V0 rating as illustrated by Example 39. Test specimens prepared from a composition having a two-component flame retardant additive mixture comprised of calcium carbonate at 59 percent by weight and the nano-silicate at 6 percent by weight also failed to achieve a V0 rating as illustrated by Examples 36.

Test specimens prepared from a composition having a two-component flame retardant additive mixture comprised of a metal hydroxide at 32.5 percent by weight and calcium carbonate at 32.5 percent by weight failed to achieved a V0 rating as illustrated by Examples 34 and 43.

Surprisingly, test specimens achieved V0 ratings when prepared from a composition having a three-component flame retardant additive at the following additive levels: (a) 29.5 percent by weight of metal hydroxide, 29.5 percent by weight of calcium carbonate, and 6 percent by weight of the nano-silicate, as illustrated by Examples 30 and 37 and (b) 31 percent by weight of metal hydroxide, 31 percent by weight of calcium carbonate, and 3 percent by weight of the nano-silicate, as illustrated by Examples 32 and 40.

TABLE I

| | Example | | | | | | | |
|---|---|---|---|---|---|---|---|---|
| | 2 | 3 | 4 | 5 | 6 | 7 | 8 | 9 |
| EVA-2 | 48.80 | 48.80 | 51.80 | 51.80 | 54.80 | 54.80 | 48.80 | 48.80 |
| Magnesium hydroxide | 14.50 | 29.00 | 16.00 | 32.00 | 17.50 | 35.00 | | |
| Aluminum trihydroxide | | | | | | | 0.00 | 14.50 |
| Calcium carbonate | 14.50 | | 16.00 | | 17.50 | 0.00 | 29.00 | 14.50 |
| 50 percent Nano-silicate Masterbatch | 12.00 | 12.00 | 6.00 | 6.00 | 0.00 | 0.00 | 12.00 | 12.00 |
| UL-94 Vertical Flaming Test | Flaming Duration | | | | | | | |
| Test Specimen 1 | 394 | 12/346 | 242 | 331 | 181 | 0/233 | 200+/NA | 300+/NA |
| Test Specimen 2 | 399 | 3/351 | 217 | 324 | 213 | 0/213 | 200+/NA | 200+/NA |
| Test Specimen 3 | 374 | 4/337 | 233 | 348 | 204 | 0/238 | | |
| Test Specimen 4 | 388 | 8/345 | 251 | 350 | 190 | 0/249 | | |
| Test Specimen 5 | 402 | 359 | 237 | 327 | 183 | 0/222 | | |
| Total Flaming Combustion Time (sec) | 1,957 | 1,765 | 1,180 | 1,680 | 971 | 1,160 | >400 | >500 |
| Ignite Cotton | No | Yes | Yes | Yes | Yes | Yes | No | No |

TABLE I-continued

| Classification | None | None | None | None | None | None | None | None |
|---|---|---|---|---|---|---|---|---|

| | | Example | | | | | | |
|---|---|---|---|---|---|---|---|---|
| | | 10 | 11 | 12 | 13 | 14 | 15 | 16 |
| EVA-2 | | 48.80 | 51.80 | 51.80 | 51.80 | 54.80 | 54.80 | 54.80 |
| Magnesium hydroxide | | | | | | | | |
| Aluminum trihydroxide | | 29.00 | 0.00 | 16.00 | 32.00 | 0.00 | 17.50 | 35.00 |
| Calcium carbonate | | 0.00 | 32.00 | 16.00 | 0.00 | 35.00 | 17.50 | 0.00 |
| 50 percent Nano-silicate Masterbatch | | 12.00 | 6.00 | 6.00 | 6.00 | 0.00 | 0.00 | 0.00 |
| UL-94 Vertical Flaming Test | | Flaming Duration | | | | | | |
| Test Specimen 1 | | 200+/NA | 100+/NA | 100+/NA | 100+/NA | 100+/NA | 100+/NA | 0/100+ |
| Test Specimen 2 | | 200+/NA | 100+/NA | 100+/NA | 100+/NA | 100+/NA | 43/100+ | 0/15 |
| Test Specimen 3 | | | | | | | | 0/32 |
| Test Specimen 4 | | | | | | | | 0/40 |
| Test Specimen 5 | | | | | | | | 0/32 |
| Total Flaming Combustion Time (sec) | | >400 | >200 | >200 | >200 | >200 | >243 | >219 |
| Ignite Cotton | | No | Yes | Yes | Yes | Yes | No | Yes |
| Classification | | None | None | None | None | None | None | None |

TABLE II

| | Example | | | | | | |
|---|---|---|---|---|---|---|---|
| | 17 | 18 | 19 | 20 | 21 | 22 | 23 |
| EVA-2 | 33.80 | 33.80 | 36.80 | 39.80 | 39.80 | 33.80 | 33.80 |
| Magnesium hydroxide | 22.00 | 44.00 | 47.00 | 25.00 | 50.00 | | |
| Aluminum trihydroxide | | | | | | 0.00 | 22.00 |
| Calcium carbonate | 22.00 | 0.00 | 0.00 | 25.00 | 0.00 | 44.00 | 22.00 |
| 50 percent Nano-silicate Masterbatch | 12.00 | 12.00 | 6.00 | 0.00 | 0.00 | 12.00 | 12.00 |
| UL-94 Vertical Flaming Test | Flaming Duration | | | | | | |
| Test Specimen 1 | 0/555 | 0/9 | 0/89 | 214 | 0/39 | 200+/NA | 188/0 |
| Test Specimen 2 | 0/541 | 0/6 | 0/22 | 188 | 0/288 | 200+/NA | 166/0 |
| Test Specimen 3 | 0/549 | 0/36 | 0/11 | 197 | 0/38 | | 56/200+ |
| Test Specimen 4 | 0/521 | 0/4 | 0/8 | 223 | 0/269 | | 4/200+ |
| Test Specimen 5 | 0/538 | 0/0 | 0/41 | 199 | 0/294 | | 312/0 |
| Total Flaming Combustion Time (sec) | 2,704 | 55 | 171 | 1,021 | 928 | >400 | >1126 |
| Ignite Cotton | No | No | No | Yes | Yes | No | No |
| Classification | None | None | None | None | None | None | None |

| | Example | | | | | |
|---|---|---|---|---|---|---|
| | 24 | 25 | 26 | 27 | 28 | 29 |
| EVA-2 | 33.80 | 36.80 | 36.80 | 39.80 | 39.80 | 39.80 |
| Magnesium hydroxide | | | | | | |
| Aluminum trihydroxide | 44.00 | 0.00 | 47.00 | 0.00 | 25.00 | 50.00 |
| Calcium carbonate | 0.00 | 47.00 | 0.00 | 50.00 | 25.00 | 0.00 |
| 50 percent Nano-silicate Masterbatch | 12.00 | 6.00 | 6.00 | 0.00 | 0.00 | 0.00 |
| UL-94 Vertical Flaming Test | Flaming Duration | | | | | |
| Test Specimen 1 | 2/24 | 200+/NA | 0/54 | 100+/NA | 0/100+ | 0/0 |
| Test Specimen 2 | 2/19 | 200+/NA | 0/52 | 100+/NA | 0/100+ | 0/100+ |
| Test Specimen 3 | 3/21 | | 0/54 | | | 0/0 |
| Test Specimen 4 | 1/32 | | 0/1 | | | 0/0 |
| Test Specimen 5 | 0/32 | | 0/4 | | | 0/0 |
| Total Flaming Combustion Time (sec) | 136 | >400 | 165 | >200 | >200 | >100 |
| Ignite Cotton | No | Yes | No | Yes | Yes | Yes |
| Classification | None | None | None | None | None | None |

TABLE III

| | Example | | | | | | | |
|---|---|---|---|---|---|---|---|---|
| | 30 | 31 | 32 | 33 | 34 | 35 | 36 | 37 |
| EVA-2 | 18.80 | 18.80 | 21.80 | 21.80 | 24.80 | 24.80 | 18.80 | 18.80 |
| Magnesium hydroxide | 29.50 | 59.00 | 31.00 | 62.00 | 32.50 | 65.00 | | |
| Aluminum trihydroxide | | | | | | | 0.00 | 29.50 |
| Calcium carbonate | 29.50 | 0.00 | 31.00 | 0.00 | 32.50 | 0.00 | 59.00 | 29.50 |
| 50 percent Nano-silicate Masterbatch | 12.00 | 12.00 | 6.00 | 6.00 | 0.00 | 0.00 | 12.00 | 12.00 |
| UL-94 Vertical Flaming Test | Flaming Duration | | | | | | | |
| Test Specimen 1 | 0/0 | 0/1 | 0/3 | 0/0 | 0/13 | 0/0 | 200+/NA | 0/0 |
| Test Specimen 2 | 0/2 | 0/2 | 0/0 | 0/0 | 0/15 | 0/0 | 200+/NA | 0/0 |
| Test Specimen 3 | 0/0 | 0/0 | 0/0 | 0/0 | 0/29 | 0/0 | | 0/0 |
| Test Specimen 4 | 0/1 | 0/0 | 0/0 | 0/0 | 0/12 | 0/0 | | 0/0 |
| Test Specimen 5 | 0/0 | 0/0 | 0/0 | 0/0 | 0/51 | 0/0 | | 0/1 |
| Total Flaming Combustion Time (sec) | 3 | 3 | 3 | 0 | 120 | 0 | >400 | 1 |
| Ignite Cotton | No | No | No | No | No | No | No | No |
| Classification | V-0 | V-0 | V-0 | V-0 | None | V-0 | None | V-0 |

| | Example | | | | | | |
|---|---|---|---|---|---|---|---|
| | 38 | 39 | 40 | 41 | 42 | 43 | 44 |
| EVA-2 | 18.80 | 21.80 | 21.80 | 21.80 | 24.80 | 24.80 | 24.80 |
| Magnesium hydroxide | | | | | | | |
| Aluminum trihydroxide | 59.00 | 0.00 | 31.00 | 62.00 | 0.00 | 32.50 | 65.00 |
| Calcium carbonate | 0.00 | 62.00 | 31.00 | 0.00 | 65.00 | 32.50 | 0.00 |
| 50 percent Nano-silicate Masterbatch | 12.00 | 6.00 | 6.00 | 6.00 | 0.00 | 0.00 | 0.00 |
| UL-94 Vertical Flaming Test | Flaming Duration | | | | | | |
| Test Specimen 1 | 0/0 | 200+/NA | 0/2 | 0/0 | 100+/NA | 0/75 | 0/0 |
| Test Specimen 2 | 0/0 | 200+/NA | 0/0 | 0/0 | 100+/NA | 1/43 | 0/0 |
| Test Specimen 3 | 0/0 | | 0/0 | 0/0 | | 0/21 | 0/0 |
| Test Specimen 4 | 0/0 | | 0/0 | 0/0 | | 0/79 | 0/0 |
| Test Specimen 5 | 0/0 | | 0/0 | 0/0 | | 0/83 | 0/0 |
| Total Flaming Combustion Time (sec) | 0 | >400 | 2 | 0 | >200 | >302 | 0 |
| Ignite Cotton | No | Yes | No | No | Yes | Yes | No |
| Classification | V-0 | None | V-0 | V-0 | None | None | V-0 |

What is claimed is:

1. A flame retardant composition comprising:
   a. a polyolefin polymer; and
   b. a three-component flame retardant additive consisting essentially of
      (i) a nano-silicate present in an amount between 0.1% and 15% by weight;
      (ii) a metal hydroxide; and
      (iii) calcium carbonate,
   wherein the calcium carbonate is present in an amount less than or equal to the amount of the metal hydroxide.

2. The flame-retardant composition of claim 1 wherein the polyolefin polymer is selected from the group consisting of ethylene polymers and propylene polymers.

3. The flame-retardant composition of claim 1 wherein the nano-silicate is a layered nano-silicate.

4. The flame-retardant composition of claim 3 wherein the nano-silicate is selected from the group consisting of montmorillonite, magadiite, fluorinated synthetic mica, saponite, fluorhectorite, laponite, sepiolite, attapulgite, hectorite, beidellite, vermiculite, kaolinite, nontronite, volkonskoite, stevensite, pyrosite, sauconite, and kenyaite.

5. The flame-retardant composition of claim 4 wherein the nano-silicate is selected from the group consisting of montmorillonite and magadiite.

6. The flame-retardant composition of claim 3 wherein the nano-silicate is treated with an organic cation.

7. The flame-retardant composition of claim 6 wherein the organic cation is selected from the group consisting of imidazolium, phosphonium, ammonium, alkyl ammonium, and polyalkyl ammonium.

8. The flame-retardant composition of claim 1 wherein the metal hydroxide is selected from the group consisting of aluminum trihydroxide and magnesium hydroxide.

9. The flame retardant composition of claim 1 wherein a surface of the metal hydroxide is coated with a material selected from the group consisting of silanes, titanates, zirconates, carboxylic acids, and maleic anhydride-grafted polymers.

10. The flame retardant composition of claim 1 wherein a surface of the calcium carbonate is coated with a material selected from the group consisting of silanes, titanates, zirconates, carboxylic acids, and maleic anhydride-grafted polymers.

11. A coating composition prepared from the flame-retardant composition of claim 1.

12. A flame-retardant wire or cable construction prepared by applying the coating composition of claim 11 over a wire or cable.

13. An article comprising the flame-retardant composition of claim 1, where the article is selected from the group consisting of extruded sheets, thermoformed sheets, injection-molded articles, coated fabrics, roofing membranes, and wall coverings.

14. A flame retardant composition comprising:
   a. a polyolefin polymer selected from the group consisting of ethylene polymers and propylene polymers;
   b. a three-component flame retardant additive consisting essentially of
      (i) a layered nano-silicate selected from the group consisting of montmorillonite and magadiite and being present in an amount between 0.1% and 15% by weight;
      (ii) a metal hydroxide selected from the group consisting of aluminum trihydroxide and magnesium hydroxide; and
      (iii) calcium carbonate,
   wherein the calcium carbonate is present in an amount less than or equal to the amount of the metal hydroxide.

15. A coating composition prepared from the flame-retardant composition of claim 14.

16. A flame-retardant wire or cable construction prepared by applying the coating composition of claim 15 over a wire or cable.

17. An article comprising the flame-retardant composition of claim 14, where the article is selected from the group consisting of extruded sheets, thermoformed sheets, injection-molded articles, coated fabrics, roofing membranes, and wall coverings.

* * * * *